United States Patent
Haga et al.

(10) Patent No.: US 12,466,434 B2
(45) Date of Patent: Nov. 11, 2025

(54) TRAVELING ROUTE DECIDING DEVICE AND AUTOMATED DRIVING SYSTEM

(71) Applicant: Mitsubishi Electric Corporation, Tokyo (JP)

(72) Inventors: Tetsuji Haga, Tokyo (JP); Keisuke Morita, Tokyo (JP); Yuta Wada, Tokyo (JP); Genki Tanaka, Tokyo (JP); Takuya Taniguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 179 days.

(21) Appl. No.: 18/473,555

(22) Filed: Sep. 25, 2023

(65) Prior Publication Data
US 2024/0190468 A1    Jun. 13, 2024

(30) Foreign Application Priority Data
Dec. 8, 2022 (JP) ................... 2022-196107

(51) Int. Cl.
*B60W 30/095* (2012.01)
*B60W 60/00* (2020.01)
*G08G 1/16* (2006.01)

(52) U.S. Cl.
CPC .... *B60W 60/0011* (2020.02); *B60W 30/0956* (2013.01); *B60W 60/0015* (2020.02); *G08G 1/164* (2013.01); *B60W 2554/20* (2020.02); *B60W 2554/40* (2020.02); *B60W 2556/50* (2020.02)

(58) Field of Classification Search
CPC ......... B60W 30/0956; B60W 60/0011; B60W 60/0015; B60W 2554/20; B60W 2554/40; B60W 2556/50; G08G 1/16; G08G 1/164; G08G 1/166
See application file for complete search history.

(56) References Cited

U.S. PATENT DOCUMENTS 11,402,842 B2 * 8/2022 Liu ................ G05D 1/0257
2018/0050694 A1  2/2018 Schroeder et al.
(Continued)

FOREIGN PATENT DOCUMENTS

JP          6545279 B2    7/2019

*Primary Examiner* — Peter D Nolan
*Assistant Examiner* — Ce Li Li
(74) *Attorney, Agent, or Firm* — Sughrue Mion, PLLC (57) ABSTRACT

This traveling route deciding device includes: an obstacle information acquisition unit which acquires obstacle information at regular intervals; an obstacle determination unit which determines whether each obstacle is a moving object or a static object, for all obstacles acquired by the obstacle information acquisition unit; a moving object list update unit which, in a case where it is determined that the obstacle is a moving object, registers the obstacle in a moving object list; a traveling prohibited area update unit which, in a case where it is determined that the obstacle is a static object, registers an area including the obstacle as a traveling prohibited area; and a traveling route deciding unit which performs calculation for avoiding collision between the vehicle and each obstacle on the basis of the updated moving object list and traveling prohibited area without using the continued traveling prohibited area, thus correcting a preset traveling route.

4 Claims, 8 Drawing Sheets

(56) References Cited

U.S. PATENT DOCUMENTS

| | | | | |
|---|---|---|---|---|
| 2018/0347992 | A1* | 12/2018 | Shimotsuma | G01C 21/3694 |
| 2020/0233420 | A1* | 7/2020 | Liu | G05D 1/0214 |
| 2021/0035442 | A1* | 2/2021 | Baig | G08G 1/0116 |
| 2021/0237769 | A1* | 8/2021 | Ostafew | G08G 1/042 |
| 2023/0012853 | A1* | 1/2023 | Tam | B60W 30/0953 |

* cited by examiner

TRAVELING ROUTE DECIDING DEVICE AND AUTOMATED DRIVING SYSTEM

BACKGROUND OF THE INVENTION

1. Field of the Invention

The present disclosure relates to a traveling route deciding device and an automated driving system.

2. Description of the Background Art

A system that generates, for a vehicle of interest traveling on a road or the like, such a route that allows the vehicle to travel safely without colliding with another vehicle and a pedestrian, has been proposed. In this route generation system, a sensor mounted to a vehicle or a sensor provided at a roadside detects another vehicle and a pedestrian moving in an area, and in a case where there is a possibility that collision will occur with a vehicle of interest, a traveling route for avoiding this is generated.

In such a traveling route generation system, results from a plurality of sensing means such as a radar, a camera, and a LiDAR are combined to detect an object as an obstacle, whereby a traveling route is generated. However, even though these sensing means can detect presence/absence of an object, it is difficult to accurately obtain a precise outline, i.e., boundary, of an object. Therefore, a traveling route generated on the basis of an object detected by these sensing means does not necessarily enable avoidance of collision. In order to completely avoid collision, the route might require a vehicle to detour more largely than necessary so as to have a margin, reduce the speed more than necessary, or stop for a long time, thus leading to an inefficient result.

In order to solve the above problem, proposed is a method in which means for detecting a free space where no objects are present and means for detecting an object are combined, whereby a target trajectory for a vehicle to pass along is examined twice regarding whether or not collision will occur (see, for example, Patent Document 1).
Patent Document 1: Japanese Patent No. 6545279

In Patent Document 1, firstly, examination is performed on the basis of measurement of a free space around a vehicle, and secondly, examination is performed on the basis of measurement of an object around the vehicle. Thus, examination needs to be performed twice. Therefore, if the number of objects as obstacles increases, the processing load increases. If the processing load exceeds a certain limit, it becomes impossible to keep up generation of a route needed for traveling, and as a result, it becomes necessary to take measures such as reducing the driving speed or stopping the vehicle, and thus the automated driving vehicle might not be able to travel efficiently.

SUMMARY OF THE INVENTION

The present disclosure has been made to solve the above problem, and an object of the present disclosure is to provide a traveling route deciding device in which the calculation amount for a traveling route is reduced, and an automated driving system that enables traveling of a vehicle on the basis of a traveling route efficiently generated by the traveling route deciding device.

A traveling route deciding device according to the present disclosure includes: an obstacle information acquisition unit which acquires information of a first obstacle from a roadside sensing device and information of a second obstacle around a vehicle from an in-vehicle sensor provided to the vehicle, at regular intervals; an obstacle determination unit which, on the basis of the information of the first obstacle and the information of the second obstacle acquired by the obstacle information acquisition unit, determines whether each obstacle is a moving object or a static object, for all obstacles including the first obstacle and the second obstacle that have been acquired; a moving object list update unit which, in a case where the obstacle determination unit has determined that the obstacle is the moving object, registers the obstacle in a moving object list; a traveling prohibited area update unit which, in a case where the obstacle determination unit has determined that the obstacle is the static object, registers an area including the obstacle as a traveling prohibited area, and among the obstacles, in a case where the obstacle determination unit has determined that the obstacle is the static object again, continues the registered traveling prohibited area for the obstacle; and a traveling route deciding unit which performs calculation so as to avoid collision with all the obstacles, on the basis of the moving object list updated by the moving object list update unit and the traveling prohibited area updated by the traveling prohibited area update unit, and thus corrects a preset traveling route of the vehicle. For the traveling prohibited area continued by the traveling prohibited area update unit, the traveling route deciding unit does not perform calculation for avoiding collision.

According to the present disclosure, detected obstacles are determined to be a moving object or a static object, and for a static object, a traveling prohibited area is continued to be set until the static object moves. Therefore, it is not necessary to repeatedly execute calculation processing for collision avoidance and the load of calculation processing in the traveling route deciding device is reduced. Thus, the automated driving system including the above traveling route deciding device can efficiently provide a traveling route to a vehicle performing automated driving.

DETAILED DESCRIPTION OF THE PREFERRED

Embodiments of the Invention

Hereinafter, an embodiment of an automated driving system according to the present disclosure will be described with reference to the drawings. In the following embodiment, an automobile is used as an example of a movable body to which the automated driving system is applied. The automobile is assumed to be capable of traveling by automated driving corresponding to level 3 or 4 defined by Society of Automotive Engineers (SAE) International, for example. In the drawings, the same reference characters denote the same or corresponding parts. Therefore, the detailed description thereof may be omitted to avoid repeating the description.

First Embodiment

Hereinafter, an automated driving system according to the first embodiment of the present disclosure will be described with reference to the drawings.

<Configuration of Automated Driving System>

Figure 1:
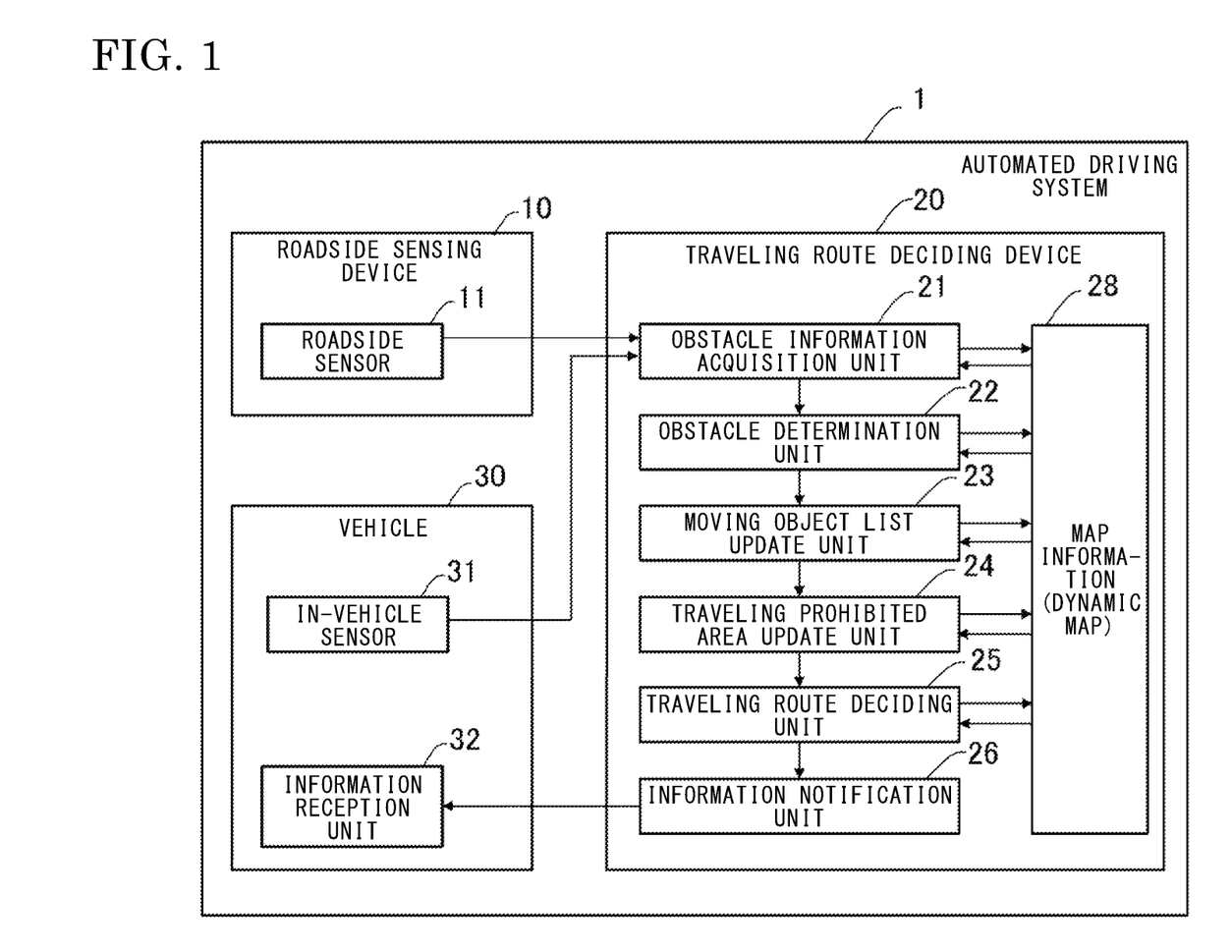
FIG. 1 is a function block diagram showing the configuration of an automated driving system according to the first embodiment of the present disclosure.

FIG. 1 is a function block diagram showing the configuration of the automated driving system according to the first embodiment. In FIG. 1, an automated driving system 1 includes a roadside sensing device 10, a traveling route deciding device 20, and a vehicle 30.

The roadside sensing device 10 is a roadside unit provided in a roadside area, for example. The roadside sensing device 10 includes a roadside sensor 11, and outputs and transmits obstacle information around a road detected by the roadside sensor 11, to an obstacle information acquisition unit 21 of the traveling route deciding device 20.

The roadside sensor 11 includes at least one of a camera, a radar, a light detection and ranging (LiDAR) device, and a sonar sensor (ultrasonic sensor), for example.

The vehicle 30 performing automated driving includes an in-vehicle sensor 31 for detecting an obstacle around the vehicle 30, and an information reception unit 32 for receiving information from the traveling route deciding device 20. The in-vehicle sensor 31 outputs and transmits the detected obstacle information to the obstacle information acquisition unit 21 of the traveling route deciding device 20.

As with the roadside sensor 11, the in-vehicle sensor 31 includes at least one of a camera, a radar, a LiDAR device, and a sonar sensor, for example. It is desirable that a plurality of in-vehicle sensors 31 are provided so as to cover the whole surrounding area around the vehicle 30, in consideration of the detection ranges of the in-vehicle sensors 31.

The traveling route deciding device 20 includes the obstacle information acquisition unit 21, an obstacle determination unit 22, a moving object list update unit 23, a traveling prohibited area update unit 24, a traveling route deciding unit 25, and an information notification unit 26. The traveling route deciding device 20 has map information 28 in advance.

The traveling route deciding device 20 receives outputs from the roadside sensor 11 and the in-vehicle sensor 31 provided to the vehicle 30 at regular intervals, and causes the states such as positions, movement speeds, movement directions, and static states of all obstacles that have been received, to be reflected in the map information 28, thus making the map information 28 as a dynamic map.

The obstacle information acquisition unit 21 receives, as obstacle information, information of another vehicle, a pedestrian, and the like around the vehicle 30, outputted from the roadside sensor 11 and the in-vehicle sensor 31 provided to the vehicle 30. Where obstacle information from the roadside sensor 11 is defined as first obstacle information and obstacle information from the in-vehicle sensor 31 is defined as second obstacle information, the first obstacle information and the second obstacle information may overlap each other. The obstacle information acquisition unit 21 uses obstacles based on the first obstacle information and the second obstacle information, as information of all obstacles.

For all the obstacles acquired by the obstacle information acquisition unit 21, the obstacle determination unit 22 determines whether each obstacle is a moving object or a static object, on the basis of information such as positions, movement speeds, and movement directions of all the obstacles that have been received, and causes the result to be reflected in the dynamic map.

The moving object list update unit 23 updates an obstacle list on the basis of the obstacle information acquired by the obstacle information acquisition unit 21. In a case where an obstacle acquired by the obstacle information acquisition unit 21 is a moving object, this object is registered in the obstacle list. In a case where the movement speed of the moving object registered in the obstacle list has become zero, i.e., the moving object has stopped, the obstacle determination unit 22 determines that this object is a static object, and therefore this object is deleted from the obstacle list. On the other hand, an object that moves from a static state is registered in the obstacle list. The updated obstacle list information is reflected in the dynamic map.

The traveling prohibited area update unit 24 updates traveling prohibited areas on the basis of the obstacle information acquired by the obstacle information acquisition unit 21. The traveling prohibited area is an area where an obstacle is present in a static state around a traveling route on which the vehicle 30 travels, and is an area including the static obstacle with margins of about 10 to 20% or about 0.5 to 1 m in width and length as compared to the size of the obstacle, for example. For an obstacle that continues being in a static state, the obstacle information detected and received by the obstacle information acquisition unit 21 at regular intervals does not change. That is, for an obstacle that is determined to be a static object again or repeatedly by the obstacle determination unit 22, the set traveling prohibited area is continued. As described above, when an object registered as the moving object in the obstacle list stops and is deleted from the obstacle list, the stopped (static) object location is added as a new traveling prohibited area. On the other hand, when an object moves from a static state, the location where the object has been present is deleted from the traveling prohibited area. The updated traveling prohibited area information is reflected in the dynamic map.

The traveling route deciding unit 25 calculates and decides a route for the vehicle 30 to avoid collision with an obstacle. In a case where the vehicle 30 performing automated driving moves from the present position to the final target position, the vehicle 30 has a traveling route calculated in advance on the map. The traveling route deciding unit 25 refers to information of movement states of moving objects on the dynamic map, moving object information based on the obstacle list information, and static object information based on the traveling prohibited areas, and updates the traveling route calculated in advance (first traveling route described later) so that the vehicle 30 avoids collision with an obstacle.

Specifically, on the basis of the dynamic map in which the obstacle list of moving objects, the movement states thereof, and the traveling prohibited areas are reflected, an equation of motion of the vehicle 30 and an equation of motion of each moving object are solved to predict whether or not collision will occur between the vehicle 30 and every obstacle. Then, a traveling route is generated by correcting the preset first traveling route so as to avoid collision with every obstacle, thus generating a new traveling route. Determination for whether or not collision will occur between the vehicle 30 and an obstacle is performed also on a static object as an obstacle, but for a static object, a traveling prohibited area including the static object is set and the area does not change until the static object starts to move. Therefore, calculation for collision determination and collision avoidance between the traveling prohibited area and the vehicle 30 need not be performed in a case where the traveling prohibited area is continued, and only has to be performed when the traveling prohibited area has changed, and thus the calculation amount of determination processing and the like can be reduced.

The information notification unit 26 transmits the traveling route decided by the traveling route deciding unit 25 to the information reception unit 32 of the vehicle 30.

The traveling route deciding device 20 may be provided to the vehicle 30.

<Application Example of Automated Driving System 1>

Next, an application example of the automated driving system 1 will be described.

Figure 2:
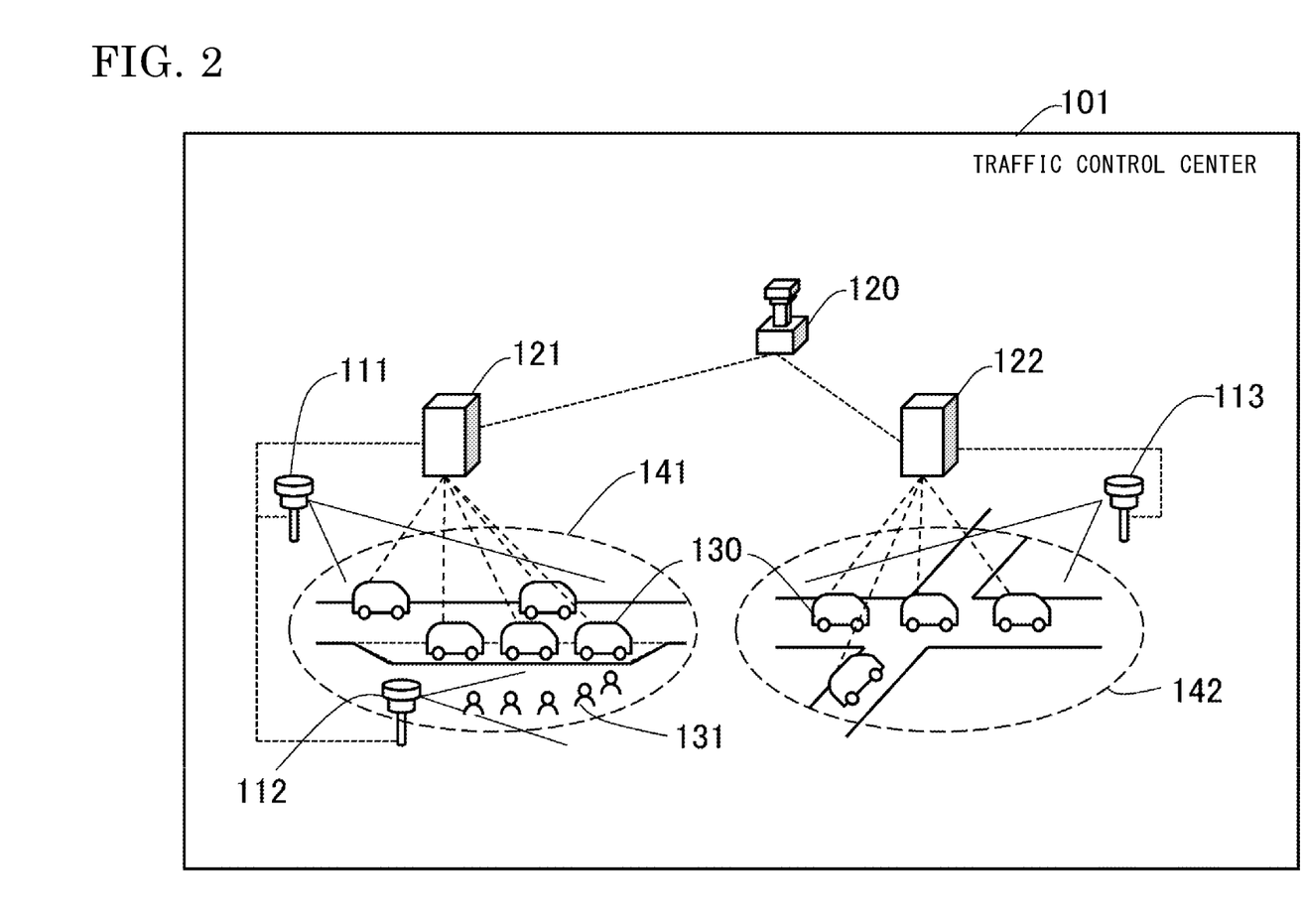
FIG. 2 shows an application example of the automated driving system according to the first embodiment.

FIG. 2 shows application of the automated driving system 1 according to the first embodiment. One traffic control center 120 is provided and coordinates the entirety of a management area 101 of the automated driving system, and integrates a first traveling route deciding device 121 coordinating a station area 141 and a second traveling route deciding device 122 coordinating an intersection area 142. Here, the traffic control center 120 also corresponds to one traveling route deciding device.

The first traveling route deciding device 121 communicates with a first roadside sensing device 111 and a second roadside sensing device 112 for detecting obstacles in the station area 141. The first roadside sensing device 111 mainly detects arrival and departure of vehicles 130 at a platform space of a station facility, for example, and therefore is sensing means for avoiding interference of the vehicles 130. The second roadside sensing device 112 mainly detects vehicles 130 and pedestrians 131 at the platform space of the station facility, for example, and therefore is sensing means for avoiding contact between the vehicle 130 and the pedestrian 131.

The second traveling route deciding device 122 communicates with a third roadside sensing device 113 in the intersection area 142 with no traffic lights. The third roadside sensing device 113 mainly detects vehicles 130 in the intersection area 142, for example, and therefore is sensing means for avoiding collision between the vehicles 130 and traffic stoppage due to giving way to each other.

<Generation of Traveling Route>

Next, a method for generating a traveling route of an automated driving vehicle will be described.

Figure 3:
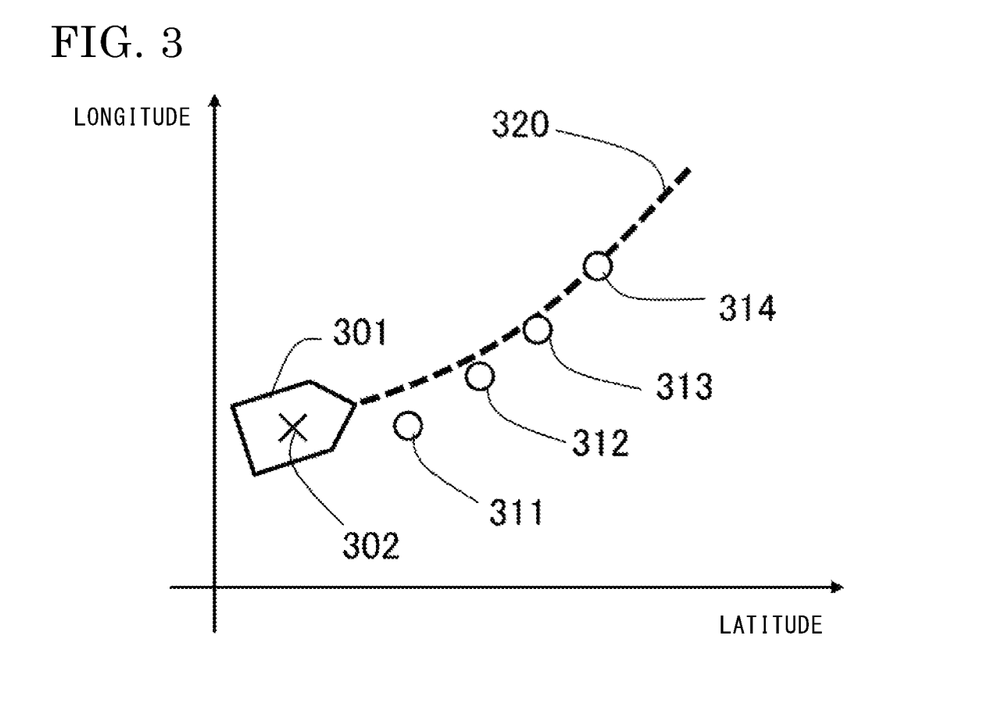
FIG. 3 illustrates a method for generating a traveling route of a vehicle performing automated driving.

FIG. 3 illustrates a method for generating a traveling route of an automated driving vehicle. In FIG. 3, in a case where a vehicle 301 performing automated driving moves from the present position to the final target position, matching is performed between a group of passing points 311, 312, 313, 314 on the map and a positioned location 302 of the own position obtained by a global navigation satellite system (GNSS) sensor or the in-vehicle sensor 31 for acquiring landmark information in the surrounding area, and thus a traveling route 320 until a certain period of time later is sequentially calculated while the vehicle 301 is traveling. FIG. 3 shows an example in which passing points are mapped by acquiring latitudes and longitudes as positioning results. The traveling route 320 is defined as a first traveling route. As with the vehicle 30 in FIG. 1, the vehicle 301 communicates with the traveling route deciding device 20 of the automated driving system 1, and includes the in-vehicle sensor 31 and the information reception unit 32.

Figure 4:
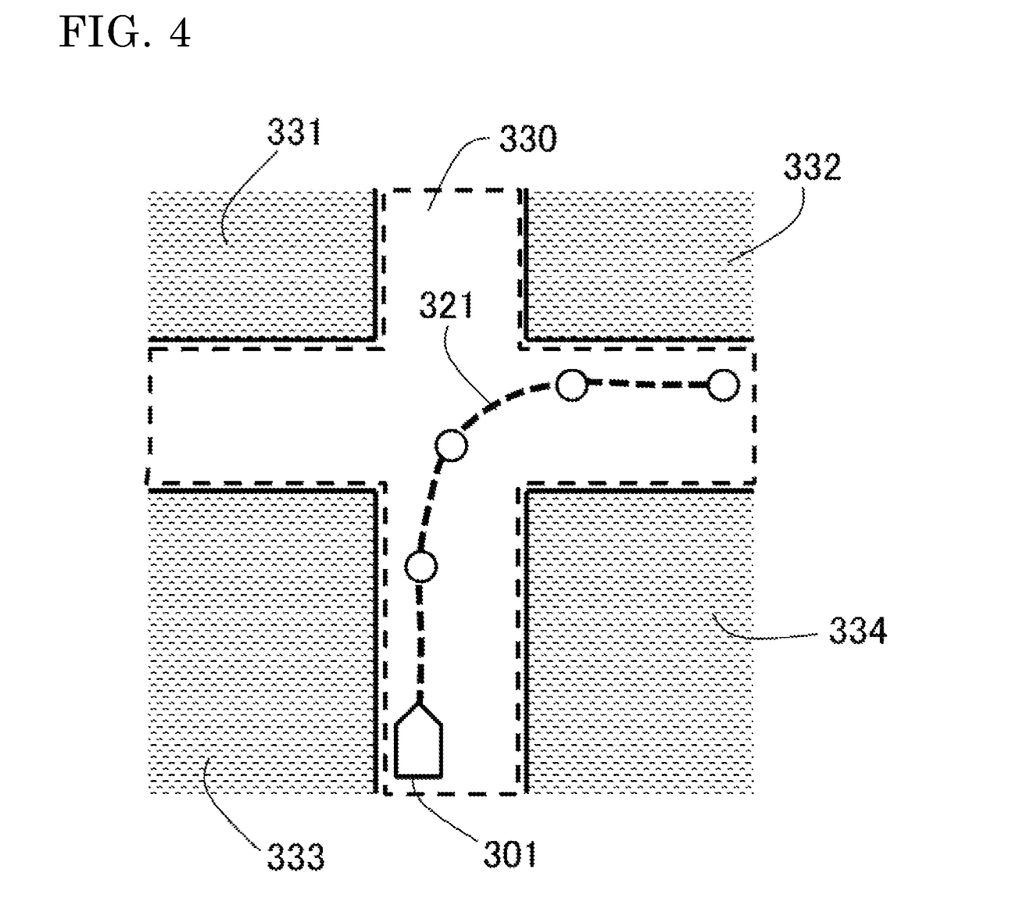
FIG. 4 illustrates a traveling route of a vehicle traveling in a road area.

FIG. 4 illustrates a generation example of a traveling route of the vehicle 301 traveling on an actual road. In FIG. 4, a road area 330 including an intersection, and non-road areas 331, 332, 333, 334, are defined, and a traveling route 321 is generated in the road area 330. In this example, the vehicle 301 travels in a direction of turning right at the intersection in the road area 330, toward a target location.

Figure 5:
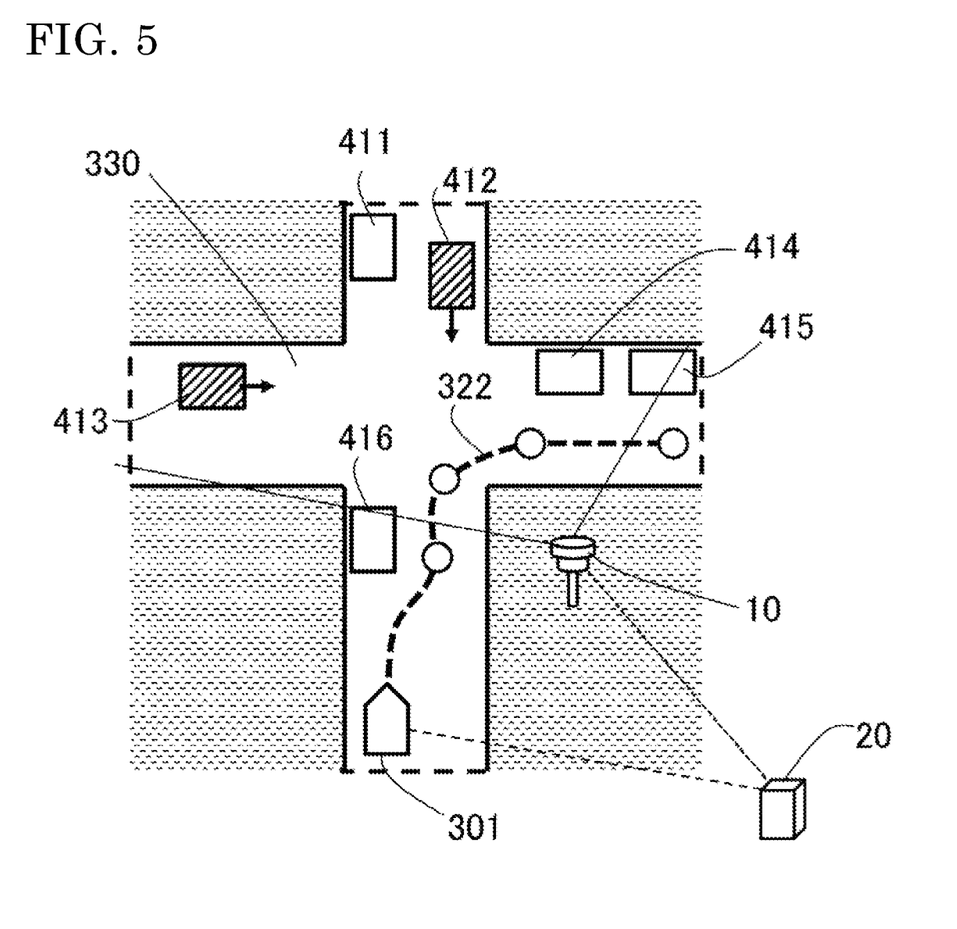
FIG. 5 illustrates a traveling route of a vehicle generated in a case where there are obstacles on a road in FIG. 4.

FIG. 5 illustrates a traveling route of the vehicle generated in a case where there are obstacles on the road in FIG. 4. In FIG. 5, obstacles 413, 412 that are moving objects (e.g., other vehicles traveling) and obstacles 411, 414, 415, 416 that are static objects (e.g., stopped vehicles and items), are present on the road area 330 including the intersection. These obstacles are detected by the roadside sensor 11 of the roadside sensing device 10 and the in-vehicle sensor 31 of the vehicle 301, and the obstacle determination unit 22 of the traveling route deciding device 20 determines whether each obstacle is a moving object or a static object, whereby the result is reflected in the map information. Then, a traveling route 322 of the vehicle 301 performing automated driving is generated by correcting the traveling route 321 in FIG. 4 so as to avoid collision with all these obstacles 411, 412, 413, 414, 415, 416. In a case where a plurality of roadside sensing devices 10 for detecting obstacles in the road area 330 are provided, obstacle information may be acquired from the plurality of roadside sensing devices 10.

Figure 6:
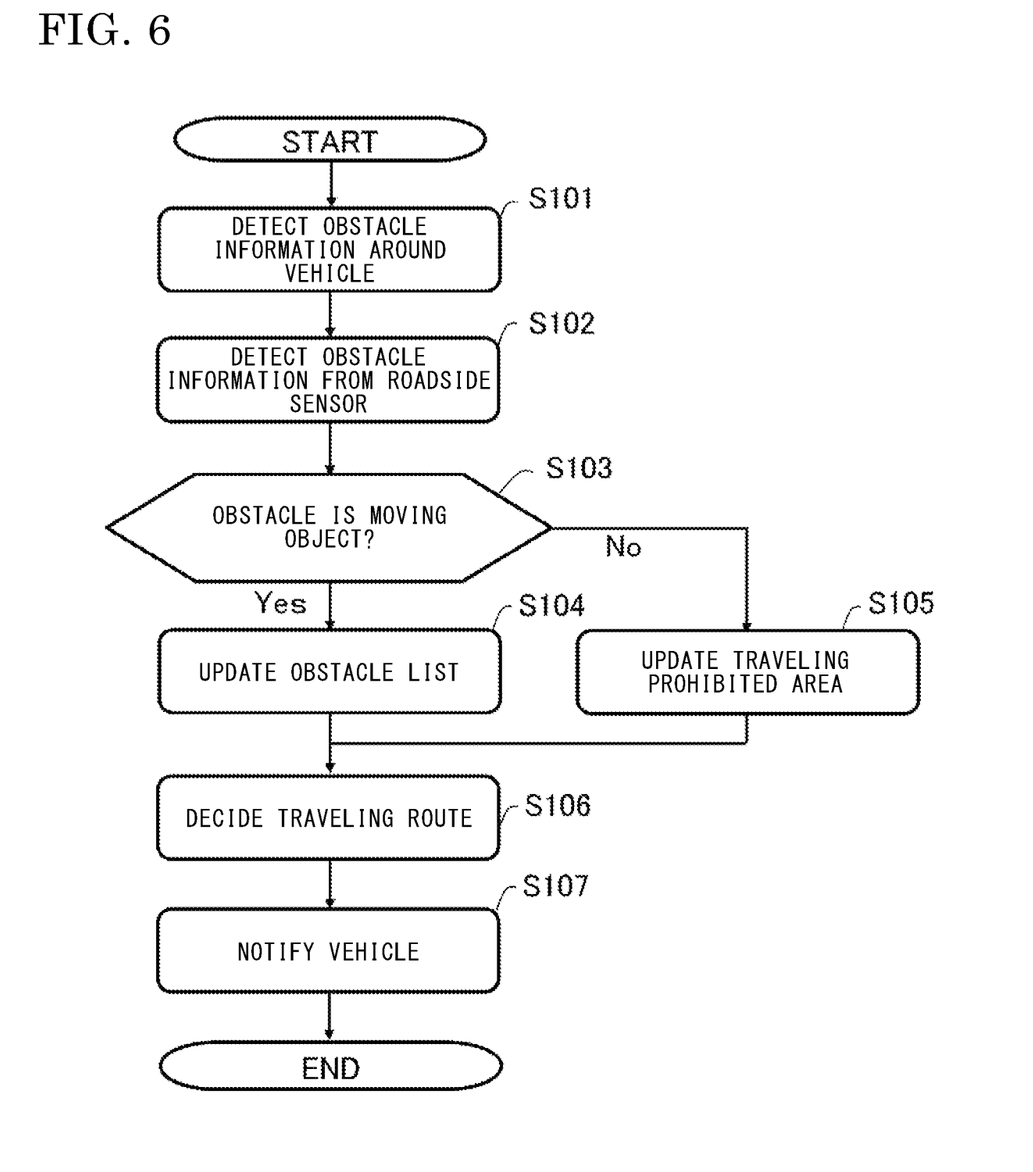
FIG. 6 is a flowchart showing operation of the automated driving system according to the first embodiment.

A specific procedure for generating a traveling route will be described with reference to FIG. 6. FIG. 6 is a flowchart showing operation of the automated driving system according to the first embodiment.

First, information of all the obstacles 411, 412, 413, 414, 415, 416 detected in the road area 330 by the roadside sensor 11 of the roadside sensing device 10 and the in-vehicle sensor 31 of the vehicle 301 is transmitted to the obstacle information acquisition unit 21 of the traveling route deciding device 20 (step S101, step S102).

Next, in step S103, on the basis of the obstacle information acquired by the obstacle information acquisition unit 21 and the movement state of each obstacle calculated by the obstacle determination unit 22, if it is determined that the obstacle is a moving object (Yes in step S103), the process proceeds to step S104, so that the moving object list update unit 23 registers the moving object in the obstacle list, thus performing update.

In step S103, if it is determined that the obstacle is not a moving object but a static object (No in step S103), the process proceeds to step S105, so that the traveling prohibited area update unit 24 sets an area including the static object as a traveling prohibited area and adds this area to traveling prohibited areas.

Figure 7:
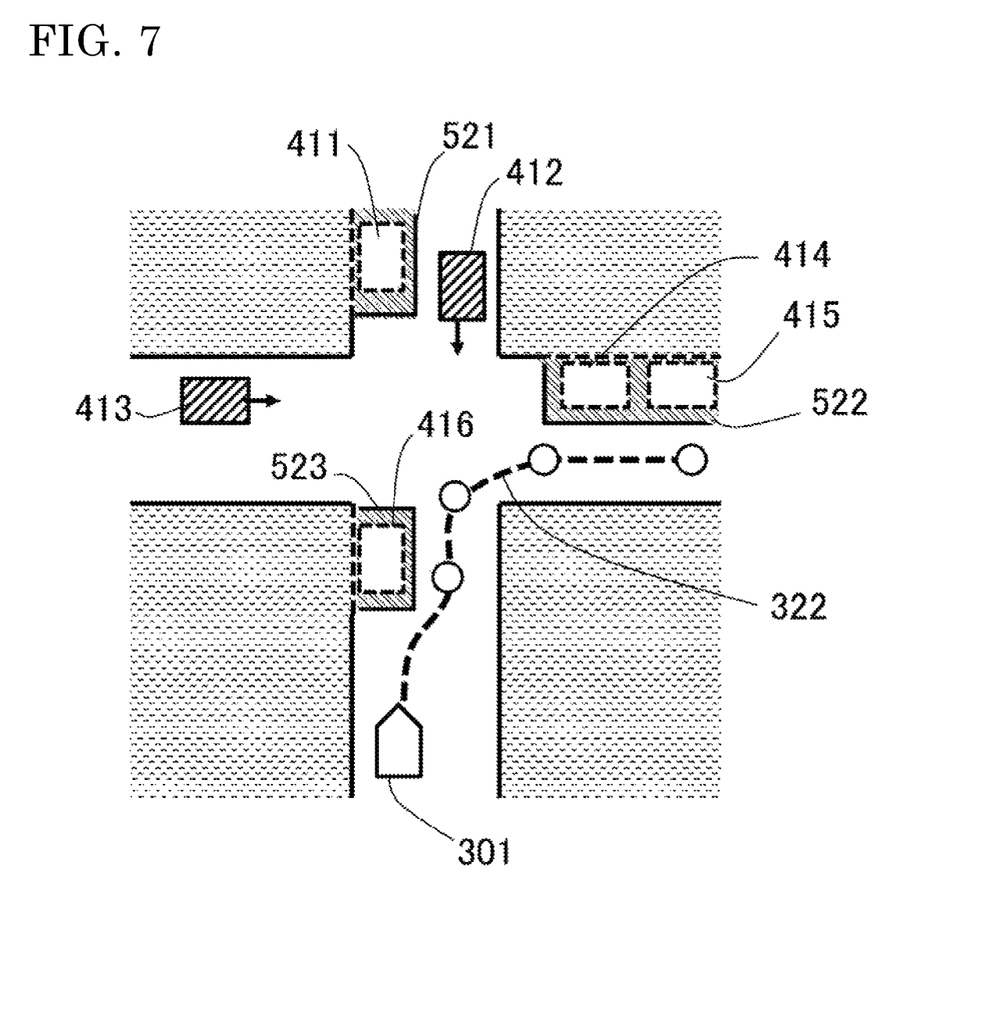
FIG. 7 illustrates a state in which traveling prohibited areas are set in FIG. 5.

FIG. 7 illustrates a state in which traveling prohibited areas are set in FIG. 5. In FIG. 7, a traveling prohibited area 521 is set so as to include the obstacle 411 which is a static object, a traveling prohibited area 522 is set so as to include both of the obstacles 414, 415 which are static objects because they are close to each other, and a traveling prohibited area 523 is set so as to include the obstacle 416 which is a static object.

Next, in step S106, on the basis of the map information 28 which is the dynamic map in which the obstacle list of the moving objects, the movement states thereof, and the traveling prohibited areas are reflected, the traveling route deciding unit 25 predicts whether or not collision will occur between the vehicle 301 and every obstacle present in the road area 330, and generates a traveling route 322 by correcting the preset first traveling route 321 so as to avoid collision with every obstacle, thus generating a new traveling route.

Specifically, for all the obstacles 411, 412, 413, 414, 415, 416 present in the road area 330, an equation of motion until a predetermined time elapses is solved using the position, the speed, the acceleration, the size (length and width), the orientation (orientation angle), and the like of each obstacle, and an equation of motion for the vehicle 301 is solved, thereby predicting whether or not collision will occur.

In step S107, information of the new traveling route 322 decided by the traveling route deciding unit 25 is transmitted from the information notification unit 26, and the information reception unit 32 of the vehicle 301 receives the information of the new traveling route 322.

During traveling of the vehicle 301, operations in steps S101 to S107 are repeated. At this time, the obstacle determination unit 22 determines whether each obstacle is a moving object or a static object, and the obstacle that is a static object is treated as a traveling prohibited area. Therefore, in step S106, in a case where the traveling prohibited area is continued, the traveling route deciding unit 25 need not sequentially perform calculation of the movement state and calculation for collision determination and collision avoidance, and thus the calculation amount is reduced.

Figure 8:
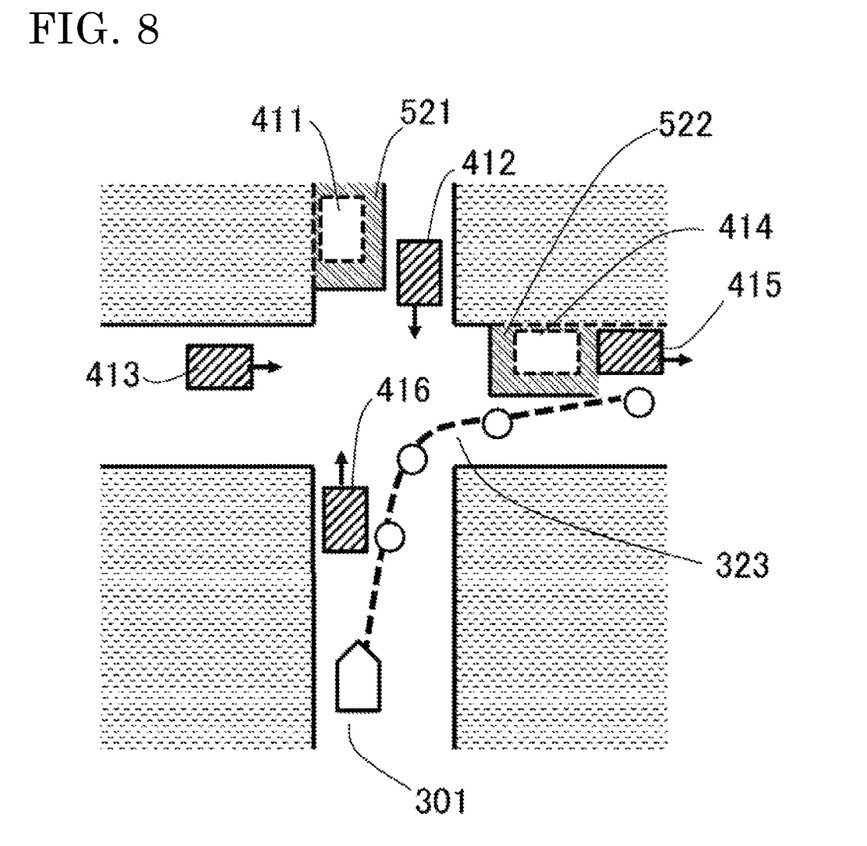
FIG. 8 illustrates an example of a traveling route of a vehicle in a case where some of obstacles move in FIG. 7.

The obstacle information acquisition unit 21 receives outputs from the roadside sensor 11 and the in-vehicle sensor 31 provided to the vehicle 30 at regular intervals and the obstacle determination unit 22 determines whether each obstacle is a moving object or a static object. Among the obstacles, the obstacle determined to be a static object again or repeatedly can be continuously treated as the traveling prohibited area until movement of the obstacle is detected (until the obstacle is determined to be a moving object). On the other hand, as shown in FIG. 8, in a case where movements of the obstacles 415, 416 which are static objects are detected, the traveling prohibited area 522 is reset, the traveling prohibited area 523 is deleted, and the obstacles 415, 416 which have become moving objects are registered in the obstacle list, thus updating the obstacle list. At this time, if movement of the obstacle 411 which is a static object is not detected, the traveling prohibited area therefor is continued and it is not necessary to perform calculation for setting a traveling prohibited area, and the like. Then, on the basis of a new dynamic map, the traveling route is corrected to a new traveling route 323.

In step S107, the vehicle 301 having received information of the new traveling route 322 travels while driving and controlling actuators such as a brake (braking means) and a steering wheel (steering means) in accordance with the received traveling route 322.

For the vehicle 301, whether or not collision will occur with each traveling obstacle is predicted, and a traveling route generated so as to avoid collision with every obstacle is provided to the vehicle 301. On the basis of this, the vehicle 301 needs to perform traveling operation including steering, acceleration/deceleration, and stoppage, in real time. For example, it is necessary to cope with a complicated situation in which there are an oncoming vehicle, a vehicle waiting to turn right, vehicles in a jam, a vehicle parked on a road, and a pedestrian to cross a road, in an urban area or the like. At this time, if the number of obstacles increases and the processing load exceeds a certain limit, it becomes impossible to keep up generation of a traveling route for avoiding collision with obstacles, so that the vehicle performing automated driving might not be able to travel appropriately.

In an actual traffic environment, not all obstacles are moving constantly, and for example, there are a vehicle waiting to turn right, vehicles in a jam, a vehicle parked at a road shoulder, and the like, and also, there is often a vehicle that stops after traveling and continues stopping as it is. If such static vehicles are treated as traveling prohibited areas without being treated as obstacles, it becomes unnecessary to always perform collision determination until a certain time period of time later, leading to significant reduction in the processing load.

Further, the moving object list and the traveling prohibited areas are reflected in the dynamic map, and update is sequentially performed in accordance with whether each obstacle is a moving object or a static object. With this function, even if the number of obstacles increases, extreme increase in the processing load does not occur, and as a result, it becomes possible to suppress reduction in traveling efficiency of a vehicle performing automated driving.

As described above, according to the first embodiment, the traveling route deciding device includes: the obstacle information acquisition unit which acquires information of obstacles at regular intervals; the obstacle determination unit which, on the basis of the information of obstacles acquired by the obstacle information acquisition unit, determines whether each obstacle is a moving object or a static object, for all obstacles; the moving object list update unit which, in a case where it is determined that the obstacle is the moving object, registers the obstacle in the moving object list; the traveling prohibited area update unit which, in a case where it is determined that the obstacle is a static object, registers an area including the obstacle as a traveling prohibited area, and in a case where it is determined that the obstacle is a static object again or repeatedly, continues the traveling prohibited area for the obstacle; and the traveling route deciding unit which corrects a preset traveling route of the vehicle on the basis of the updated moving object list and traveling prohibited area. With this configuration, obstacles are classified into a moving object and a static object, and among the obstacles, for a static object continued as the traveling prohibited area, it becomes unnecessary to repeat calculation regarding whether or not collision will occur, until movement of the static object starts. Thus, the calculation amount is reduced and the load of calculation processing is reduced.

In addition, according to the first embodiment, the automated driving system includes the above traveling route deciding device, a vehicle which detects obstacle information around the vehicle, and a roadside sensing device which detects obstacle information. Thus, even if the number of detected obstacles increases, it is possible to efficiently provide a traveling route corrected so as to avoid collision, to the vehicle performing automated driving.

Figure 9:
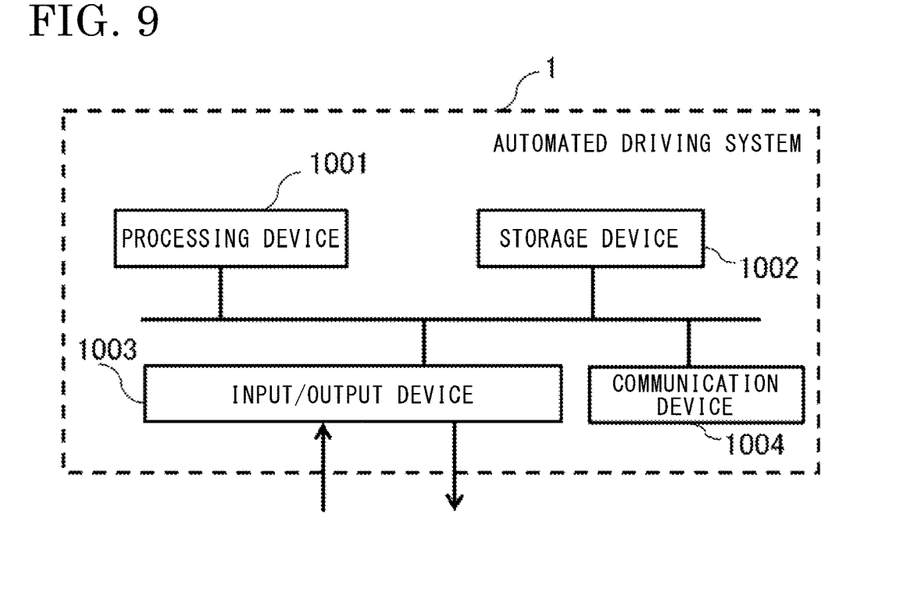
FIG. 9 shows an example of a hardware configuration of the automated driving system according to the first embodiment.

As shown in a hardware example in FIG. 9, the automated driving system 1 according to the above first embodiment includes a processing device 1001, a storage device 1002 including a read only memory (ROM) storing a program for executing the functions of the function units and a random access memory (RAM) storing data of execution results of the function units which are calculation results by the program, an input/output device 1003, and a communication device 1004. The processing device 1001 executes the program inputted from the storage device 1002. The traveling route deciding device 20 may have a similar hardware configuration, or may implement the functions in the hardware configuration of the automated driving system 1.

The communication device 1004 includes a long-range communication unit and a short-range communication unit as a communication module. As the long-range communication unit, the one compliant with a predetermined long-range wireless communication standard such as long term evolution (LTE) or fourth/fifth-generation mobile communication system (4G/5G) is used. For the short-range communication unit, for example, dedicated short range communications (DSRC) are used. For these communications, certain communication speeds are ensured. These communications may be used between the roadside sensing device 10 and the traveling route deciding device 20, and between the vehicle 30 and the traveling route deciding device 20.

The traveling route deciding device 20 may be provided to the vehicle 30. In this case, for example, LTE or 5G is used in communication of obstacle information from the roadside sensing device 10 to the traveling route deciding device 20.

Each sensor of the in-vehicle sensor 31 is provided to the vehicle, and information from each sensor is collected through communication lines to an information acquisition unit (not shown) in the vehicle, and then is transmitted to the traveling route deciding device 20. The communication lines in the vehicle are connected using Controller Area Network (CAN) (registered trademark), for example.

For the processing device 1001, a processor such as a central processing unit (CPU) or a digital signal processor (DSP) is used. Dedicated hardware may be used for the processing device 1001. In a case where the processing device 1001 is dedicated hardware, the processing device 1001 is, for example, a single circuit, a complex circuit, a programmed processor, a parallel-programmed processor, an application specific integrated circuit (ASIC), a field-programmable gate array (FPGA), or a combination thereof.

The function units of the traveling route deciding device 20 and the automated driving system 1 may be each implemented by an individual processing device, or may be collectively implemented by one processing device.

Regarding the function units of the traveling route deciding device 20 and the automated driving system 1, some of the functions may be implemented by a processing device as dedicated hardware, and other functions may be implemented by software, for example. Thus, the functions described above may be implemented by hardware, software, etc., or a combination thereof.

Each constituent component described in the above embodiment may be implemented as software or firmware, or as hardware corresponding thereto. In both concepts, each constituent component is referred to as "unit", "processing circuit", etc.

Although the disclosure is described above in terms of an exemplary embodiment, it should be understood that the various features, aspects, and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS

| | |
|---|---|
| 1 | automated driving system |
| 10 | roadside sensing device |
| 11 | roadside sensor |
| 20 | traveling route deciding device |
| 21 | obstacle information acquisition unit |
| 22 | obstacle determination unit |
| 23 | moving object list update unit |
| 24 | traveling prohibited area update unit |
| 25 | traveling route deciding unit |
| 26 | information notification unit |
| 28 | map information |
| 30, 130, 301 | vehicle |
| 31 | in-vehicle sensor |
| 32 | information reception unit |
| 101 | management area |
| 111 | first roadside sensing device |
| 112 | second roadside sensing device |
| 113 | third roadside sensing device |
| 120 | traffic control center |
| 121 | first traveling route deciding device |
| 122 | second traveling route deciding device |
| 131 | pedestrian |
| 141 | station area |
| 142 | intersection area |
| 302 | positioned location |
| 311, 312, 313, 314 | passing point |
| 320, 321, 322, 323 | traveling route |
| 330 | road area |
| 331, 332, 333, 334 | non-road area |
| 411, 412, 413, 414, 415, 416 | obstacle |
| 521, 522, 523 | traveling prohibited area |
| 1001 | processing device |
| 1002 | storage device |
| 1003 | input/output device |
| 1004 | communication device |

What is claimed is:

1. A traveling route deciding device comprising:
an obstacle information acquirer to acquire information of a first obstacle from a roadside sensing device and information of a second obstacle around a vehicle from an in-vehicle sensor provided to the vehicle, at regular intervals;
an obstacle determiner which, on the basis of the information of the first obstacle and the information of the second obstacle acquired by the obstacle information acquirer, determines whether each obstacle is a moving object or a static object, for all obstacles including the first obstacle and the second obstacle that have been acquired;
a moving object list updater which, in a case where the obstacle determiner has determined that the obstacle is the moving object, registers the obstacle in a moving object list;
a traveling prohibited area updater which, in a case where the obstacle determiner has determined that the obstacle is the static object, registers an area including the obstacle as a traveling prohibited area, and among the obstacles, in a case where the obstacle determiner has determined that the obstacle is the static object again, continues the registered traveling prohibited area for the obstacle; and
a traveling route decider which performs calculation so as to avoid collision with all the obstacles, on the basis of the moving object list updated by the moving object list updater and the traveling prohibited area updated by the traveling prohibited area updater, and thus corrects a preset traveling route of the vehicle based on a dynamic map, wherein for the traveling prohibited area continued by the traveling prohibited area updater, the traveling route decider does not perform calculation for avoiding collision,
wherein the traveling route deciding device further comprises at least one processor configured to implement the obstacle information acquirer, the obstacle determiner, the moving object list updater, the traveling prohibited area updater and the traveling route decider,
wherein the traveling route deciding device is configured to retrieve a pre-stored map from a memory, generate the dynamic map by updating the pre-stored map with obstacle state information including positions, movement speeds, movement directions, and static states of the obstacles included in the pre-stored map, and store the dynamic map in the memory.

2. An automated driving system comprising:
the traveling route deciding device according to claim 1;
the vehicle; and
the roadside sensing device, wherein
information of the first obstacle is transmitted from the roadside sensing device to the traveling route deciding device at regular intervals, information of the second obstacle is transmitted from the vehicle to the traveling route deciding device at regular intervals, the corrected traveling route is transmitted from the traveling route deciding device to the vehicle, and the vehicle travels on the basis of the corrected traveling route.

3. The traveling route deciding device according to claim 1, wherein
in a case where the obstacle for which the traveling prohibited area is set moves, the traveling prohibited area updater cancels the traveling prohibited area for the obstacle and the moving object list updater adds the obstacle to the moving object list, and
in a case where the obstacle registered in the moving object list stops and is determined to be the static object by the obstacle determiner, the moving object list updater deletes the obstacle from the moving object list and the traveling prohibited area updater adds an area including the obstacle as the traveling prohibited area.

4. An automated driving system comprising:
the traveling route deciding device according to claim 3;
the vehicle; and
the roadside sensing device, wherein
information of the first obstacle is transmitted from the roadside sensing device to the traveling route deciding device at regular intervals, information of the second obstacle is transmitted from the vehicle to the traveling route deciding device at regular intervals, the corrected traveling route is transmitted from the traveling route deciding device to the vehicle, and the vehicle travels on the basis of the corrected traveling route.

* * * * *